Dec. 23, 1930.     G. D. MAJOR     1,785,965
MOTOR GENERATOR
Filed Feb. 1, 1929     3 Sheets-Sheet 1

George D. Major
INVENTOR
BY Victor J. Evans
ATTORNEY

Dec. 23, 1930.        G. D. MAJOR            1,785,965
                     MOTOR GENERATOR
              Filed Feb. 1, 1929    3 Sheets-Sheet 2

George D. Major
INVENTOR

BY Victor J. Evans
ATTORNEY

Dec. 23, 1930.  G. D. MAJOR  1,785,965
MOTOR GENERATOR
Filed Feb. 1, 1929  3 Sheets-Sheet 3
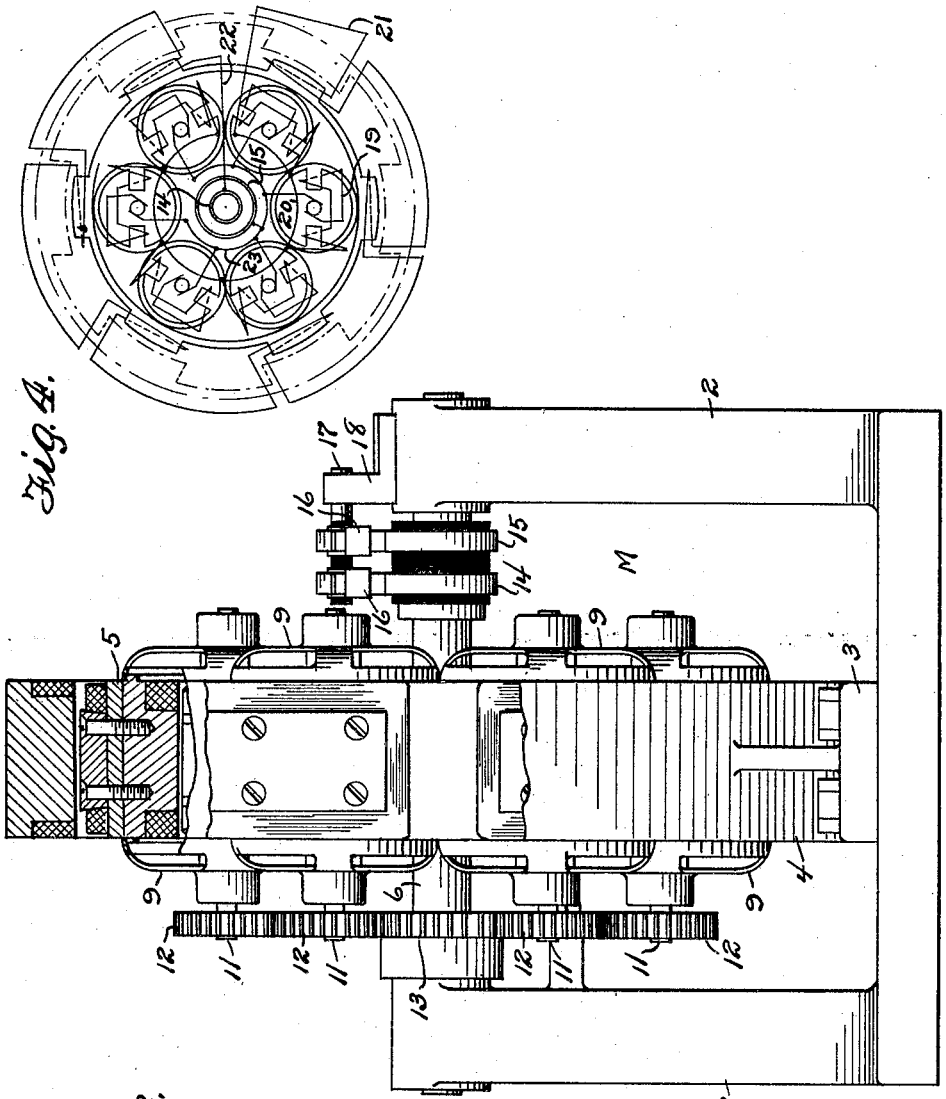

Patented Dec. 23, 1930

1,785,965

UNITED STATES PATENT OFFICE

GEORGE D. MAJOR, OF CUMBERLAND, MARYLAND

MOTOR GENERATOR

Application filed February 1, 1929. Serial No. 336,879.

The invention relates to motor generators and has for its principal object the provision of a novel arrangement of an entirely self-contained assembly including a motor and generator means which will be very compact and consequently occupy substantially minimum floor space and which will, moreover, eliminate any necessity for the employment of belts and pulleys.

An important object of the invention is to provide a device of this character which will be simple and inexpensive to make, easy to use and repair and which will therefore be advantageous for use in isolated localities.

Briefly considered, the invention comprises a motor generator including an annular row of generators on the rotor of an electric motor, so that the generators will revolve with the rotor, with means for rotating the armatures of the generators as they revolve through means of a stationary ring gear and a gear on each armature shaft meshing with the ring gear and means for leading the current from the generators through the coils of the rotor of the motor for conducting the current back to the generators.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is an edge view with parts in section.

Figure 4 is a diagrammatic view of the circuits.

Figure 1:
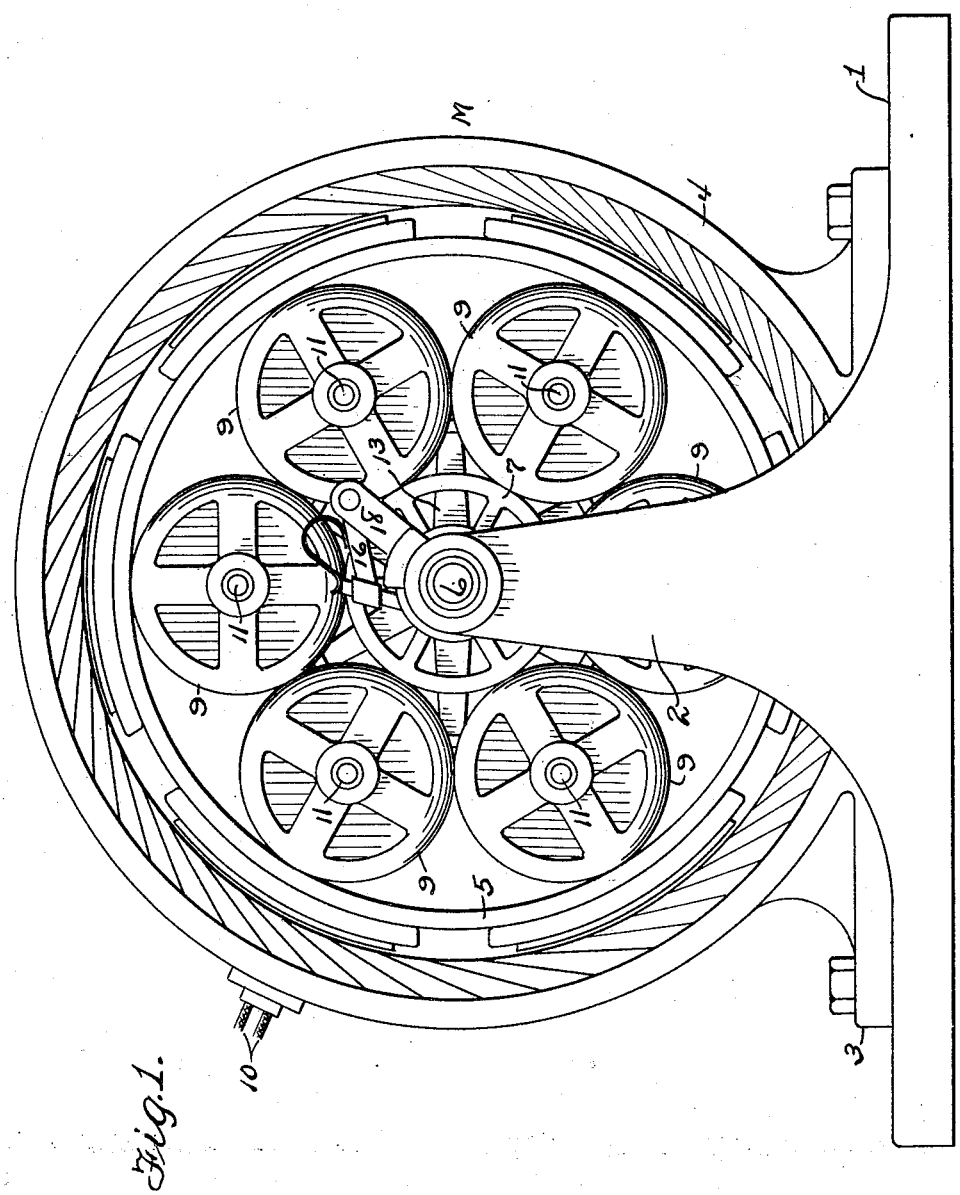
Figure 1 is a view of one side of the device.
Figure 2:
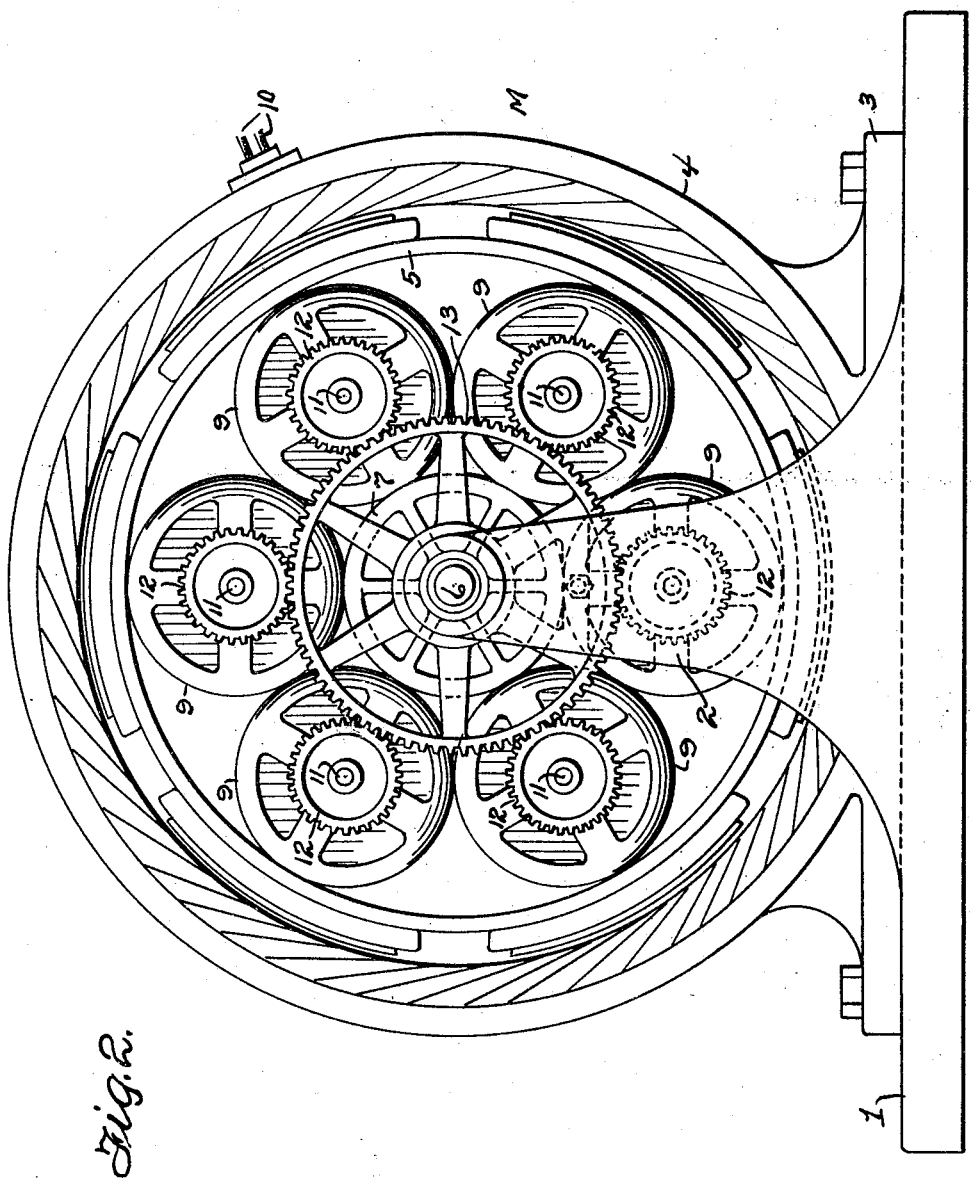
Figure 2 is a view of the opposite side.

In these views, the numeral 1 indicates a base which is formed with the pedestals 2 at its ends and upon the central part of which the base 3 of the stator 4 of the motor M is connected. Arranged within the stator is a direct current field rotor 5, this rotor being ring shape as shown. A shaft 6 is journaled in the pedestals and carries a hub 7 between which and the inner circumference of the rotor, a plurality of direct current generators 9 are arranged, the casings of these generators being suitably connected with the hub and the rotor. Thus the generators are mounted within the confines of the rotor and will revolve therewith when current is supplied to the motor through the conductors 10. The armature shaft 11 of each generator has a gear 12 fastened thereto and a large gear 13 is fastened to one of the pedestals in such a manner that the gears 12 mesh therewith and thus the armatures of the generators will rotate as the generators revolve with the rotor.

Rings 14 and 15 are mounted on the shaft 6 and insulated therefrom, and cooperating with these rings are brushes 16 carried by a support 17 attached to a bracket 18 on one of the pedestals. These brushes are connected by conductors to the device to be supplied with current.

As shown in Figure 4, the generators are connected in parallel and the current produced by each generator passes over the wires 19, through the fields of the generator to a common conductor 20 which is connected by the lead 21 with the coils of the rotor 5, so that the coils of the rotor are connected in series with the generators. The coils are connected by a lead 22 with the inner ring 14 and the outer ring 15 is connected by the leads 23 with the brushes for the commutators of the generators.

Thus the current produced by the generators will pass through the coils of the rotor of the motor and then pass to the device which is to be supplied with current, and then the current returns to the generators.

The device possesses several advantages, one being that it saves floor space on account of its compactness. Furthermore as the structure is all self-contained it does away with the use of belts and pulleys and consequently avoids the troubles that arise from belt slipping. The construction is simple and the machine will cost less than the usual type of directly driven exciters on low speed machines. It is advantageous for use in isolated localities as for example to a user in a small town or other place remote from an armature repair shop. It will be easier to buy and keep a spare generator in order to make a quick repair, than it would be to have the armature of a belted exciter repaired. It is thought that these and other advantages will be apparent to one skilled in the art without further explanation.

What I claim is:—

1. A device of the class described comprising an electric motor including a stator and a direct current field rotor, a plurality of direct current generators mounted within the confines of the rotor, means for rotating the armatures of the generators as they revolve with the rotor, said generators being connected in parallel with each other and in series with the coils of the rotor and means for conducting the current, after the same has passed through the coils, to a device to be supplied with current and then conducting the current back to the generators.

2. A device of the class described comprising an electric motor including a stator and a direct current field rotor, an annular series of direct current generators mounted within the confines of the rotor, a gear on the armature shaft of each generator, a stationary gear with which the before mentioned gears mesh whereby the armatures of the generators are rotated as the generators revolve with the rotor, said generators being connected in parallel with each other and in series with the coils of the rotor, means for conducting the current after it passes through the coils to the point of use and means for returning the current from said point back to the commutators of the generators.

3. A device of the class described comprising a base, a motor supported thereon and including a stator and a direct current field rotor, a shaft journaled in the base and to which the rotor is connected, a plurality of direct current generators within the confines of the rotor arranged in an annular row, a gear on the armature shaft of each generator, a stationary gear on the base with which the said gears mesh whereby the armatures of the generators are rotated as the generators revolve with the rotor, said generators being connected in parallel with each other and in series with the coils of the rotor, means for conducting the current after passing through the coils to the point of use, means for returning the current from said point to the commutators of the generators, such means including a pair of rings connected with and insulated from the shaft and brushes engaging the rings.

In testimony whereof I affix my signature.

GEORGE D. MAJOR.